United States Patent
Brun et al.

(10) Patent No.: US 8,429,141 B2
(45) Date of Patent: Apr. 23, 2013

(54) LINGUISTICALLY ENHANCED EMAIL DETECTOR

(75) Inventors: Caroline Brun, Grenoble (FR); Caroline Hagège, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 121 days.

(21) Appl. No.: 13/037,450

(22) Filed: Mar. 1, 2011

(65) Prior Publication Data
US 2012/0226707 A1  Sep. 6, 2012

(51) Int. Cl.
*G06F 17/30* (2006.01)
(52) U.S. Cl.
USPC .......................................................... 707/694
(58) Field of Classification Search .................. 707/2, 3, 707/694; 709/223; 704/9
See application file for complete search history.

(56) References Cited

U.S. PATENT DOCUMENTS

| | | | |
|---|---|---|---|
| 5,062,143 A | 10/1991 | Schmitt | |
| 6,405,162 B1 * | 6/2002 | Segond et al. | 704/9 |
| 7,058,567 B2 | 6/2006 | Aït-Mokhtar et al. | |
| 7,574,349 B2 | 8/2009 | Perronnin | |
| 2007/0233459 A1 * | 10/2007 | Perronnin | 704/9 |
| 2009/0235280 A1 | 9/2009 | Tannier et al. | |

FOREIGN PATENT DOCUMENTS

WO  WO 01/27828  4/2001

OTHER PUBLICATIONS

Chanod, et al. "Tagging French text: tagset, dedicated lexicons and guesser," Proc. From Texts to Tags: Issues in Multilingual Language Analysis, EACL SIGDAT workshop, 1995.
Grefenstette. "Comparing Two Language Identification Schemes," Proc. 3rd Intern'l Conf. on the Statistical Analysis of Textual Data (JADT'95), 1995.
http://legacy.xrce.xerox.com/competencies/content-analysis/tools/guesser.en.html accessed Jan. 17, 2011.
Brun. "A Client/Server Architecture for Word Sense disambiguation," in Proceedings of Coling 2000, p. 132, Saarbrücken, Germany.
Aït-Mokhtar, et al., "Robustness beyond shallowness: incremental dependency parsing," in special issue of the NLE Journal, 2002.
Brun, et al., "Normalization and paraphrasing using symbolic methods," ACL: Second International workshop on Paraphrasing, Paraphrase Acquisition and Applications, 2003.

(Continued)

*Primary Examiner* — Etienne LeRoux
(74) *Attorney, Agent, or Firm* — Fay Sharpe LLP

(57) ABSTRACT

A computer-implemented system and method are provided for warning a user of a missing attachment to an email. The method may include automatically recognizing a natural language of text of an email and selecting a keyword list from a plurality of keyword lists, based on the recognized natural language. Each keyword list is associated with a respective natural language and includes at least one keyword. At least one of the keyword lists includes a multi-sense keyword having a plurality of senses. A first of the plurality of senses is recognized as referring to an attachment and a second of the plurality of senses is recognized as not referring to an attachment. The text of the email is processed to identify an instance, where present, of a keyword that is in the selected keyword list and, for a keyword which is a multi-sense keyword, at least one sense-related rule is applied to a portion of the text which includes the instance of the multi-sense keyword. Based on the application of the at least one sense-related rule, where the email lacks an attachment, a notification is provided to the user.

22 Claims, 4 Drawing Sheets

OTHER PUBLICATIONS

Karttunen. "Applications of Finite-State Transducers in Natural Language Processing," Proceedings of CIAA-2000, Lecture Notes in Computer Science, 2000.

U.S. Appl. No. 12/794,212, filed Jun. 4, 2010, Meunier, et al.
U.S. Appl. No. 12/854,543, filed Aug. 11, 2010, Brun.

* cited by examiner

LINGUISTICALLY ENHANCED EMAIL DETECTOR

BACKGROUND

The exemplary embodiment relates to electronic mail messages and finds particular application in connection with a system and method for detection of missing attachments.

When sending electronic mail messages (emails), the sender has the opportunity to attach one or more attachments to the message. The attachments can be documents, other email messages, and the like. In the body of the email, the sender may make a textual reference to the attachments. The email and its attachments are sent to a designated recipient. A problem arises in that an email is sometimes sent before the attachments have been attached to the email. Current email applications may therefore include a missing attachment detector that warns the user writing the email that an intended attachment may have been omitted. The detector looks for a given set of keywords (such as "attached," "document," and the like) in the body of the email. Based on the occurrence of such words, the detector determines that the sender may have forgotten to add the attachment.

This is a useful functionality to have as it can save the embarrassment of being asked for the attachments by the recipient or more serious consequences, for example, when the attachment is due by a predetermined date. However some problems can be identified, which reduce the usefulness of such a detector. One problem is that the triggering set of keywords may have to be defined explicitly within a list by the user. This may involve entering all inflected forms of the keywords. Because of the lack of morphological inflections in English, current English language attachment detectors can use a fixed set of keyword patterns and this approach is relatively satisfactory. For example, the words "attach" and "attached" may be sufficient, in a keywords list, to cover commonly-used expressions of the verb "to attach." The same approach for languages which are morphologically richer than English could multiply the number of entries. For example, in the case of the verb "joindre" in French (which partly corresponds to the English verb "attach"), five keywords would be needed to obtain the same coverage: "joins" (je joins), "joint" (j'ai joint), "jointe" (la pièce jointe), "joints" (les documents joints), and "jointes" (les pieces jointes). For languages with even richer morphological systems, even more encoding could be needed.

Another problem is that the user may have occasion to write emails in different languages. While the user could enter keywords in each language used, this may cause ambiguity problems, where a word is indicative of an attachment in one language but the same word in another language is not. For example, the word "joint" may indicate an attachment in French but would not in English.

Moreover, in some cases, simple keyword detection is not sufficient to detect the sender's intent to attach a document. For example, the user may type in English: "I am very much attached to my wife," which could trigger an incorrect warning because attached is not referring to an attachment to the email. In French, similar problems could arise in the use of the word "attaché" (attached/endeavored).

The consequences of these problems are both noise (unwanted warnings) and silence (omitted helpful warnings) by the detector.

INCORPORATION BY REFERENCE

The following references, the disclosures of which are incorporated herein in their entireties by reference, are mentioned:

U.S. Pat. No. 5,062,143, issued Oct. 29, 1991, entitled TRIGRAM-BASED METHOD OF LANGUAGE IDENTIFICATION, by John C. Schmitt, discloses a mechanism for examining a body of text and identifying its language. Successive trigrams, into which the body of text is parsed, are compared with a library of sets of trigrams. For a respective language-specific key set of trigrams, if the ratio of the number of trigrams in the text, for which a match in the key set has been found, to the total number of trigrams in the text is at least equal to a prescribed value, then the text is identified as being possibly written in the language associated with that respective key set.

U.S. Pat. No. 6,405,162, issued Jun. 11, 2002, entitled TYPE-BASED SELECTION OF RULES FOR SEMANTICALLY DISAMBIGUATING WORDS, by Frederique Segond, et al., discloses a method of semantically disambiguating words using rules. The rules include rules derived from two or more types of information in a corpus that are applicable to words occurring in specified contexts. Information is obtained about a context in which a semantically ambiguous word occurs in an input text. A first rule is selected rather than a second rule to disambiguate the semantically ambiguous word according to a selection order based on the types of corpus information from which the rules are derived.

U.S. Pat. No. 7,058,567, issued Jun. 6, 2006, entitled NATURAL LANGUAGE PARSER, by Salah Aït-Mokhtar, et al., discloses a method and a parser for syntactically analyzing an input string.

U.S. Pat. No. 7,574,349, issued Aug. 11, 2009, entitled STATISTICAL LANGUAGE-MODEL BASED SYSTEM FOR DETECTION OF MISSING ATTACHMENTS, by Florent Perronnin, discloses a method for processing electronic mail which includes computing a probability that a text string in an electronic mail message refers to an attachment as a function of a stored probability value for each of a plurality of sequences of words within the text string. Where the email message lacks an attachment, the method includes prompting a user if the computed probability indicates that the text string refers to an attachment.

PCT Publication WO/2001/027828, entitled METHODS AND APPARATUS FOR VERIFYING THE PRESENCE OF INTENDED EMAIL ATTACHMENTS, by James D. Logan, provides an email warning which is based only on the presence of the specific letters "attach" in the content of the email.

The following relate generally to processing of emails: U.S. Pub. No. 20090235280, published on Sep. 17, 2009, entitled EVENT EXTRACTION SYSTEM FOR ELECTRONIC MESSAGES, by Xavier Tannier, et al.; U.S. application Ser. No. 12/794,212, filed on Jun. 4, 2010, entitled DETECTING CONFLICTS IN EMAIL MESSAGES, by Jean-Luc Meunier, et al.; and U.S. application Ser. No. 12/854,543, filed on Aug. 11, 2010, entitled SYSTEM AND METHOD FOR HANDLING MULTIPLE LANGUAGES IN TEXT, by Caroline Brun.

BRIEF DESCRIPTION

In accordance with one aspect of the exemplary embodiment, a method for providing a warning to a user of a missing attachment to an email includes recognizing a natural language of text of an email and selecting a keyword list from a plurality of keyword lists, based on the recognized natural language. Each of the keyword lists is associated with a respective natural language and includes at least one keyword. At least one of the keyword lists includes a multi-sense keyword having a plurality of senses. A first of the plurality of senses is recognized as referring to an attachment and a second of the plurality of senses is recognized as not referring to an attachment. The text of the email is processed to identify an instance of a keyword that is in the selected keyword list. For the identified instance, the method includes determining whether the keyword is a multi-sense keyword. For an instance where the keyword is determined to be a multi-sense keyword, at least one sense-related rule is applied to a portion of the text which includes the instance of the keyword. Based on the application of the at least one sense-related rule, and where the email lacks an attachment, a notification is provided to the user.

In another aspect, a system for processing emails includes a language guesser configured for recognizing a natural language of the text of an email. A plurality of keyword lists is stored in memory. Each of the plurality keyword lists is associated with a respective natural language and includes at least one keyword. At least one of the keyword lists includes at least one multi-sense keyword having a plurality of senses. A first of the plurality of senses is recognized as referring to an attachment and a second of the plurality of senses is recognized as not referring to an attachment. A keyword list selector selects a keyword list from the plurality of keyword lists, based on the recognized natural language. A linguistic processor is configured for processing the text to identify syntactic relations that include an instance of the multi-sense keyword and for applying at least one sense-based rule for evaluating whether the instance is referring to an attachment. A notification component is configured for providing a notification of a missing attachment to a user where the email lacks an attachment and where the linguistic processor determines, based on the applied rule, that the user intended to add an attachment to the email. A computer processor implements the language guesser, keyword list selector, linguistic processor, and notification component.

In another aspect, a method for detecting a missing attachment to an email includes providing a list of keywords in a selected natural language and providing information designating at least one of the keywords in the list as a multi-sense keyword having a plurality of senses. At least one of the plurality of senses is recognized as referring to an attachment and another of the plurality of senses is recognized as not referring to an attachment. At least one sense-related rule is provided for identifying an instance of a multi-sense keyword in text of an email which is being used in the sense that is recognized as referring to an attachment. Text of an email is processed to identify an instance of one of the keywords that is in the keyword list. Based on the provided information, it is determined whether the keyword for the instance is a multi-sense keyword. For an identified instance of a keyword which is a multi-sense keyword, at least one of the sense-related rules is applied to a portion of the text which includes the instance of the multi-sense keyword to determine whether the instance is being used in a sense that is recognized as referring to an attachment. An attachment is detected as missing for the email when the instance is determined to be used in a sense recognized as referring to an attachment and the email lacks an attachment.

In another aspect, a method for generating rules for identifying an email which is referring to an attachment includes providing a set of text strings, each of the text strings including an instance of a multi-sense keyword which has a plurality of senses. A first of the senses is recognized as referring to an attachment and a second of the plurality of senses is recognized as not referring to an attachment. Each text string is associated with one of the plurality of senses in which the instance is being used. Each text string is parsed to identify one or more syntactic relations which include the respective instance. Based on at least one of the identified syntactic relations, a sense-based rule is generated which is also based on the associated sense in which the instance is used.

DETAILED DESCRIPTION

Figure 1:
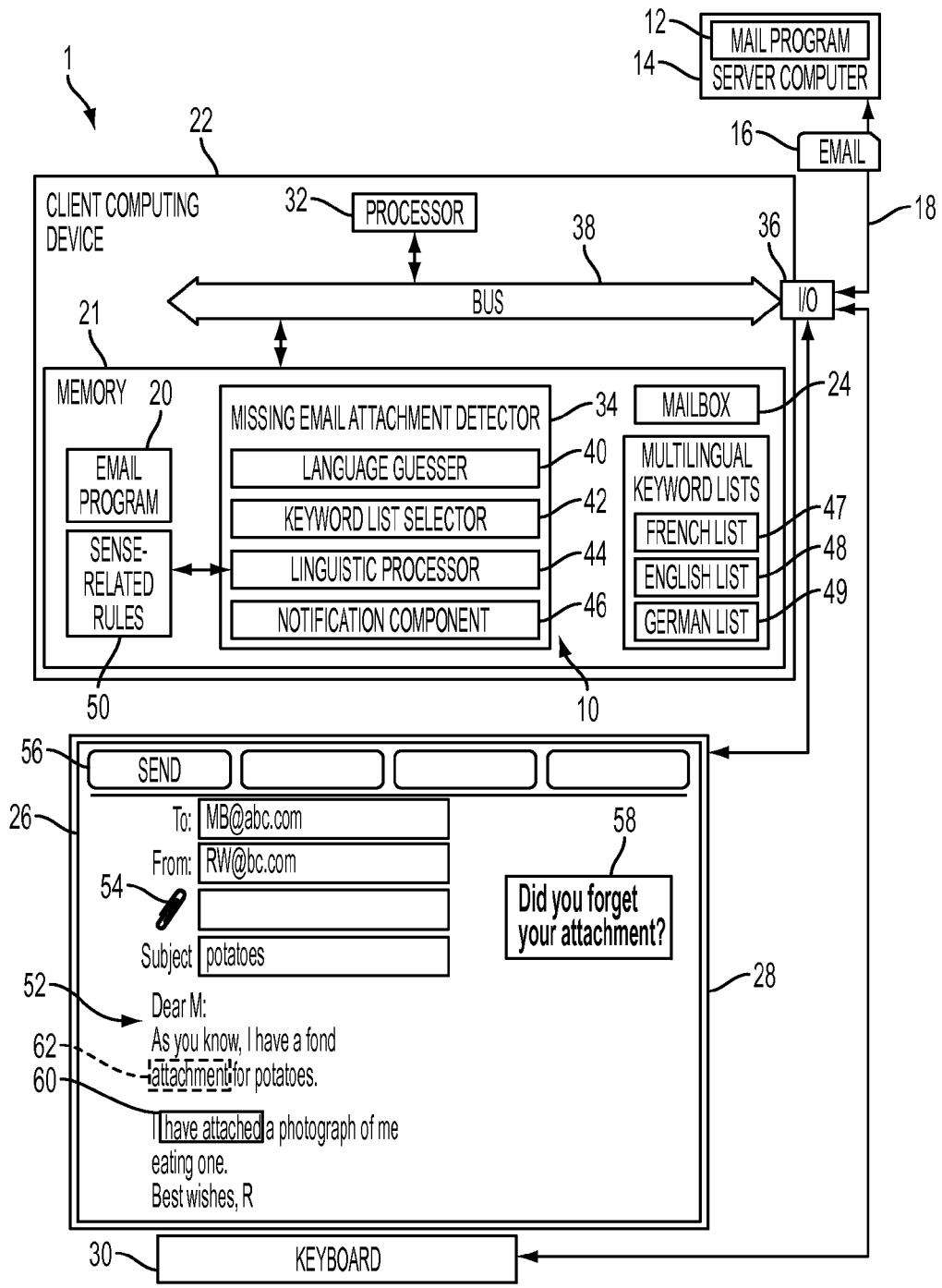
FIG. 1 illustrates a system for processing an email and for generating a warning when a missing attachment is detected.

The exemplary embodiment relates to a system for processing electronic mail which includes a missing email attachment detector ("detector") that checks for missing attachments to electronic mail messages ("emails"), to a method for processing electronic mail, and to a method for developing such a system.

The exemplary system and method help to address some of the problems with conventional missing attachment detection systems. In the exemplary embodiment, the content of an email is processed by Natural Language Processing (NLP) in order to detect the effective intent of the sender regarding whether the user intended to attach a document (or not). This may include semantic disambiguation, in the case of an instance of a keyword in the text of the email which has more than one sense, to identify whether the keyword is being used in a sense which is designated as being indicative of an email attachment or in another sense which has not been so designated. The exemplary method may employ language guessing of the main language of the email and restricting the keywords to those which are on a list for the main language.

In various aspects, the exemplary detector scans the content of an email for keywords that imply that the user may have wanted to attach a document in a given natural language. When an instance of a keyword is found, if the keyword is listed as having more than one sense and where one (or more) of these senses is unrelated to an email attachment, the context of the keyword is evaluated to determine in which sense it is being applied. Where the email includes at least one keyword which is determined, from its context, to be used in a sense that is related to an email attachment (an "attachment sense"), then when the user tries to send the email, if no document is attached, a notification is provided to the user. For example, a dialog box is opened to ask the user if he wants to send the email as is, or if he wants to attach a document (or multiple documents) prior to sending the email.

As used herein, a "sense" of a word is one of the distinct meanings that instances of the word may have. Some words have many different senses, depending on the contexts in which instances of the words occur.

To "semantically disambiguate" or "disambiguate" a word means to reduce ambiguity in the meaning of an instance of the word. For example, if the word has more than one sense in a dictionary, and one or more of these senses is not indicative of an email attachment (a "non-attachment sense"), disambiguation may be performed by reducing the number of senses that could apply or by selecting one sense that applies to the instance of the word in order to determine from the context, whether the word is being used in an attachment sense.

A "rule" is an item of data that indicates a relationship between a context in which the rule applies and a result of applying the rule. A "semantic disambiguation rule" is a rule that applies to a word based on its context and results in disambiguation of the word.

A "document" or "attachment" refers generally to any email attachment, such as a text document, spreadsheet, report, form, image file, audio file, audiovisual data file, database contents, another email which has been converted into an attachment, combinations thereof, and the like.

A "text string" can be one (or more) entire sentence(s), or a shorter sequence of words, such as a phrase or clause. In general, a sentence can be a string of text ending in a period and may be offset from any previous sentence by a period, or occasionally in informal text by a line break.

A "keyword" can be a single word or a short phrase comprising two or more words and which is less than an entire sentence. In the exemplary embodiment, some or all of the keywords may be stored as a root form or "lemma" which is an underlying form that can have two or more surface forms. These surface forms can be found as instances of the keyword in the text of an email. Rules are stored for linking instances in email text to the underlying lemma form of the keyword.

A "dictionary" is used herein to mean a corpus in which words are associated with descriptions of the words' meanings, and in particular, which enable identifying whether a selected word has more than one sense.

FIG. 1 illustrates an exemplary email system 1 in which a missing email attachment detector ("detector") 10 operates in accordance with the exemplary embodiment. A server-based mail program 12 resides on a server computer 14 and is configured for managing the exchange of emails 16 over one or more networks 18. The network 18 can a local area network (LAN), a wide area network (WAN), such as the Internet, a telephone line, or other wired or wireless link, which serves as an electronic conduit for the emails 16. A client-based email program 20, which may be stored in memory 21 of a client device 22, implements a mail box 24 that receives and holds the emails for a user. The email program 20 contains computer program instructions for implementing an electronic mail application for creating and sending e-mail messages and attachments. Electronic mail applications are well known, such as Microsoft Outlook™ and Netscape Messenger™ systems. The email program also implements a graphical user interface 26, using a linked display device 28 and a user input device 30, to enable a user to open and read emails easily and conveniently, in addition to creating new emails. A processor 32, in communication with memory 21, such as the CPU of client device 22, implements the email program 20 and the detector 10.

The exemplary detector 10 is hosted by the client computing device 22. In other embodiments, the detector 10 may be at least partly (or entirely) resident on the server 14 in communication with a user's computing device, or elsewhere on the network 18. The computer(s) 14, 22 can each include one or more general purpose computing devices or dedicated computing device(s), such as a desktop computer, laptop computer, personal digital assistant, cell phone or other device with e-mail receiving and sending capability.

The detector 10 may be embodied in hardware, or a combination of hardware and software. In one embodiment, the detector 10 serves as a plug-in component to the email program 20. The exemplary detector 10 includes processing instructions 34, stored in memory 21, which are executed by an associated processor, such as computer processor 32. In particular, the processor 32 executes the computer program instructions 34 for implementing the detection method described below with reference to FIG. 2. One or more interfaces 36 allow the computer 22 to communicate with other devices via the computer network 18. The interface 18 may include a modulator/demodulator (MODEM). The components 21, 32, 36 of the computing device 22 may communicate via a data/control bus 38.

The exemplary instructions 34 include a language guesser 40, a keyword list selector 42, a linguistic processor 44, such as a natural language parser, and a notification component 46, although fewer or more components may be provided. These components are best understood with reference to the method described below. Briefly, the language guesser 40 identifies a single language for the email from a set of natural languages. The keyword list selector 42 selects a keyword list specific to the identified language. The list is selected from a set of keyword lists 47, 48, 49 stored in memory 21, one for each of a set of natural languages. Each stored list 47, 48, 49 of keywords includes a set of keywords that are indicative of an email attachment in at least one sense in the respective language. Where a keyword has more than one sense and at least one of those senses is a not-attachment sense, the keyword may be tagged accordingly to indicate that it is a multi-sense keyword which triggers disambiguation rule(s). For each of these multi-sense keywords, one or more sense-related disambiguation rules 50 is/are provided in memory 21 for identifying the sense of an instance of identified keyword in the context in which it is used in the email.

The linguistic processor 44 processes the email text sufficiently for identification of any keywords in the relevant keyword list for the identified language. If a keywords is/are found which is/are tagged as multi-sense keyword(s), the linguistic processor 44 performs further natural language processing of the text. This includes applying the sense-related rules 50 to determine whether the keyword is being used in an attachment sense, which is indicative of an attachment.

In use, an email user will typically create an email message 16 using the email program 20 running on his or her computer or accessible thereto via the computer network. For example, the user types or otherwise enters text 52 in a natural language such as English or French, using the associated keyboard 30. This forms the body of the email and may be displayed on the display screen 26. The email will include an email "address" for the intended recipient. At any time during the creation of the email, the user may decide to attach one or more attachments to the body 52 of the email, e.g., by clicking on an attachment icon 54. This opens a dialog box where a user can browse accessible documents and select one or more to be attached. When the user has finished entering the message, the user may "send" the email to the intended recipient, together with the attachments, if any, by clicking on a send icon 56. The email program 20 then electronically transmits the message over the computer network 18. The recipient, using an email program running on the recipient's computer, can then "receive" the message and linked attachments. The exemplary detector 10 can be working in the background as the user types the message or may operate after the user has actuated the send button 56.

If the linguistic processor 44 identifies an instance of at least one keyword on the relevant list 47, 48, or 49 and which is used in a sense which is indicative of an email attachment, information based thereon is sent to the notification component 46. The notification component 46 checks to see if there is a linked attachment. If there is no attachment, component 46 provides a notification 58, such as a pop up, which warns the user that an intended attachment may have been omitted. The warning may provide the user with the opportunity to add an attachment or to decline to add an attachment, as the user thinks appropriate. Or, the warning may simply be a transient pop up which can be ignored and will disappear after a short period of time, irrespective of the user's subsequent actions.

As will be appreciated, although the various processing components 40, 42, 44, 46 are described as separate modules, one or more of these may be separated into additional modules or combined. Some of the processing components may work on the input of a prior module. In some cases, text may be returned to a prior module for further processing.

The digital processor 32 can be variously embodied, such as by a single-core processor, a dual-core processor (or more generally by a multiple-core processor), a digital processor and cooperating math coprocessor, a digital controller, or the like. In general, any device, capable of implementing a finite state machine that is in turn capable of implementing the flowchart shown in FIG. 2, can be used as the processor.

The memory or memories 21 may represent any type of non-transitory computer readable medium such as random access memory (RAM), read only memory (ROM), magnetic disk or tape, optical disk, flash memory, or holographic memory. In one embodiment, the memory 21 comprises a combination of random access memory and read only memory. Exemplary memory 21 stores instructions for performing the exemplary method as well as the processed e-mails 16 and the multilingual keyword lists 47, 48, 49 which are employed in the exemplary method.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into the computers 14, 22. Computer 14 can be similarly configured to computer 22, i.e., with memory and a processor. Since the configuration and operation of programmable computers are well known, they will not be described further.

While the exemplary system 10 is illustrated as being physically located on a single computing device 20, it is to be appreciated that one or more components 21, 32, 34, 36, 38, or subcomponents of the system 10 may be remote from one another, e.g., on a client and server.

Figure 2:
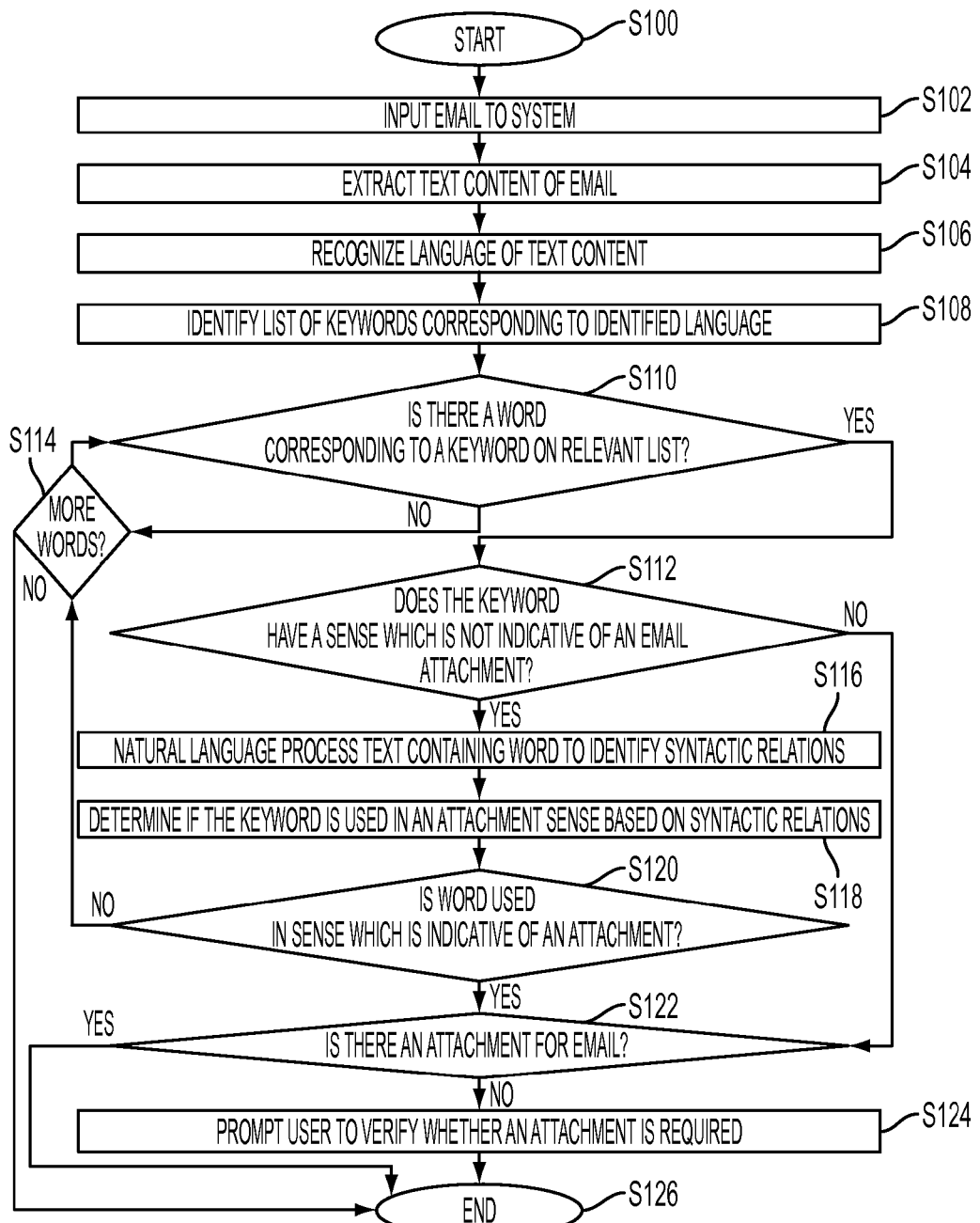
FIG. 2 is a flow diagram of a method for detecting a missing email attachment in accordance with another aspect of the exemplary embodiment.

With reference now to FIG. 2, a flowchart illustrating an exemplary missing email attachment detection method is shown. The method may be performed with the system shown in FIG. 1. As will be appreciated, the method may include fewer, more, or different steps and that the steps need not all proceed in the order illustrated. The method begins at S100.

At S102, the generation of an email 16 is detected by the system and the email may be input to the system 10.

At S104, text content 52 is extracted from the email. The system may wait until the user has typed a few words or a sentence before proceeding to the next step.

At S106, the text content 52 (e.g., everything entered up to that time) may be processed (by the language guesser 40) to determine its predominant language.

At S108, a relevant list 47 of keywords corresponding to the identified language is identified.

At S110, the e-mail text is processed to identify one or more keywords. The processing may be performed on the body of the e-mail and the e-mail header to identify surface forms of words in the text which have a lemma form recognized as corresponding to a keyword in the relevant keyword list 47. If such a word is found, the method proceeds to S112, if not, the system may proceed to S114 to see if there are more words in the text of the email still to be processed. If so, the method returns to S110. The detector 10 may process the email sentence by sentence as the user types the email. Thus, the method may return to step S110 several times.

At S112, a check is made to see if the keyword identified at S110 is a multi-sense keyword, i.e., is listed as having a non-attachment sense in addition, of course, to an attachment sense. If so, the method proceeds to S116, otherwise to S122.

At S116, text containing the identified word is natural language processed to identify syntactic relations of which it forms a part.

At S118, based on the identified relations, the sense of the multi-sense word, in the context of the email message, is identified. In particular, a determination is made as to whether the word corresponding to a keyword is being used in an attachment sense, by applying rules to the natural language processed text. If at S120 the word is being used in an attachment sense, the method proceeds to S122, otherwise to S114.

At S122, a determination is made as to whether there is an email attachment. If not, the method proceeds to S124, otherwise to S126. Step S122 may be performed at an earlier stage and, if an attachment is found, the subsequent processing steps can be omitted.

At S124, a notification 58 is provided. For example, the user may be prompted to verify whether an attachment is missing. This step may be performed, for example, when the user hits the send button 56.

The method ends at S126, and can be repeated with each new email 16 that is input. As will be appreciated, the method may return to an earlier step, such as S114, as additional text is typed.

Further details of the exemplary system 10 and method now follow.

Email Input (S102)

In one embodiment, all emails 16 generated by the sender are automatically input to the system 10. In other embodiments, the system may only operate on a selected class of emails, such as those going to a selected group of recipients, or excluding certain recipients.

Text Extraction (S104)

The linguistic processor 44 extracts text 52 from the body of the email 16. In the exemplary embodiment, only the current email text content is processed, i.e., the method does not consider any earlier emails in a string of emails appended to the current email. In the text extraction, all the words and any associated punctuation typed by the user up to that point may be extracted.

Language Recognition (S106)

The language guesser 40 detects the predominant language in the email. The language guesser 40 may be one which operates at the document level, using the entire email body/header or whatever text has been typed up to that point, and identifies a main language for the text as a whole. The language guesser may identify the language of a text, based on a statistical method (e.g., using trigrams or, more generally, n-grams, where n can be, for example, 2, 3, 4, or 5). The language guesser may additionally or alternatively base the language identification on the presence and/or frequencies of certain words, word endings, and the like. The language guesser 40 may be resident in memory 21 of the computer 22 or accessible thereto, e.g., on server 14.

Exemplary language guessers 40 are described, for example, in Gregory Grefenstette, "Comparing Two Language Identification Schemes," Proc. 3rd Intern'l Conf. on the Statistical Analysis of Textual Data (JADT'95), Rome, Italy (1995), which compares two standard technologies (trigram versus small word) to perform the task; and above-mentioned U.S. Pat. No. 5,062,143). Using such tool, a sequence like: "Og Lykken vendes kan om til Nød" is guessed as Danish, or "已把整盒「看圖識字」一百三十個方塊字都學懂了。" is guessed as Chinese.

One currently available language guesser 40 which can be used for guessing any one of 47 languages is available from Xerox Corporation. Such a language guesser may be extended to cover additional languages or reduced to exclude languages not expected to be found in the input text and/or for which there is no keyword list.

Language guessers are particularly useful for guessing the language of entire sentences or paragraphs, functioning best with a minimum length of a sequence of words (e.g., 7-9 words). This kind of tool tends to be very accurate, and in the vast majority of cases, a few words are enough to be able to state in which language a message is written. However, for shorter emails, if the language guesser is not able to assign a language with confidence, the email may be assumed to be in a default one of the languages, e.g., based on the user's past email habits. Text which is not in one of the languages recognized by the guesser may be ignored, flagged as not being processable, or translated prior to further processing.

The language guesser aims to identify a single language for the text of the email. Thus, if there are two languages used in the email, the language guesser may identify a language for at least the majority of the text, i.e., the predominantly used language. If the language guesser is unable to guess the language, S106 may be repeated after more text has been typed. In some embodiments, a default language may be selected if the language guesser has been unable to assign a language to the email text with at least a threshold probability. In other embodiments, the method may proceed to S122 or S126 if no language can be guessed.

Once the language of the message is detected, the correct keywords list 47, 48, or 49 is activated (S108). As a result, only relevant keywords for the identified language will be considered.

Keyword Lists

A keyword list 47, 48, 49 is stored for each of two or more languages, such as three, five, or at least ten languages. Keywords are thus organized separately for the different languages.

The advantage of having these separate lists is to avoid misleading attachment warnings for cases where a string corresponds to words with different meanings in different languages.

Each keyword list 47, 48, 49, etc., which may be in the form of finite state transducers, indexes a set of words or phrases that are often used when an email attachment is present (attach, document, etc.) allowing these to be tagged accordingly. Each keyword list for a respective one of the languages may include at least one or at least two keywords and in some embodiments, from three to one hundred keywords, each of which has been determined to be indicative of an email attachment in at least one sense of the word. At least one of the keyword lists includes at least one multi-sense word. The lists 47, 48, 49 may be stored in memory 21 or elsewhere, such as at a remote location which is accessed, for example, via the Internet.

While three lists 47, 48, 49 are shown in FIG. 1, any number of such keyword lists may be stored. A user may, for example, elect to download or create lists in his or her own selected languages. In other embodiments, the lists may be combined into a single multilingual list, with each keyword being tagged according to a respective language. In this case, some words may appear twice if they have different sense-related rules for different languages.

Each keyword is represented in the list by its lemma form (root form). The lemma may have one or more surface forms. Words in an email which have that lemma form can be recognized as instances of that keyword, through application of grammar rules. While some keywords may have the same surface form as the lemma, at least some of the lemmas have two or more surface forms. In the exemplary embodiment, all keywords on the list are present as lemma forms.

For each word or at least some words in the email message text 52, the lemma form is identified. Specifically, using lemma patterns, the lemma of a word in the email text is identified. The identified lemma is compared to the keywords (lemmas) in the keyword list. If the lemma is found in the keyword list, this triggers step S112.

Thus, for example, the words "attach" and "attached" need not both be explicitly present in the keywords list, but rather, only the lemma form "attach" of both these instances is present. The lemma patterns can be implemented using well-known finite-state techniques and are sufficient to cover all the relevant instances, such as verb tenses in the case of verbs and noun forms in the case of nouns (singular, plural, etc.). For example, in the case of the lemma for the verb "attach," the expressions: "attach," "have attached," "has been attached," "is attached," etc., may be linked to the same lemma form, "attach." This is particularly beneficial for morphologically rich languages where there may be numerous different surface forms as well as inflections. Some possible surface forms may be excluded from the patterns. For example, future and past perfect tenses may be excluded such that expressions "will attach" and "was attached" may be excluded from the patterns for the lemma "attach."

The keywords (lemmas) may be associated, in the list, with a corresponding part-of-speech (POS), such as noun, verb, or adjective, and optionally some additional morphological information. Where a word has more than one part of speech, only those parts-of-speech which have been associated with an email attachment may be listed. For example, the word "document" can be a noun and a verb. Since only the noun form is relevant to a missing email attachment, the POS which is listed for "document" is "noun", which can, of course, be abbreviated, such as N for noun. Since attachment-related keywords tend to be nouns and verbs, in one embodiment, rules for identifying the lemmas for only these parts of speech need to be provided. In the case of a verb, the lemma can be the infinitive form. In the case of a noun, the lemma can be the singular form.

The keyword lists also include sense information, particularly for keywords having two or more senses (context-dependent meanings) where one or more of the senses is/are not an attachment sense. When a keyword is identified which is listed as having two or more senses and has at least one sense which is designated as being a non-attachment sense (S112), this information triggers one or more rules for identifying the sense in which the word is being used in the context of the surrounding email text (S116, S118).

In this way, the detector 10 considers not only the lemma which corresponds to an email attachment warning, but also the sense of the lemma that may trigger the attachment warning.

Word Sense Disambiguation (S116)

When a multi-sense keyword is detected (S12), this triggers word sense disambiguation (S116, S118). As an example, consider the noun "attachment" in English. Using a dictionary, it can be determined that that this word has different senses:

Sense 1: attachment as a feeling (affection or regard for a person or a cause)
Sense 2: an object to be attached, a supplementary part
Sense 3: a legal term related to seizure of property In the context of a missing attachment warning, only sense 2 is relevant. So, in the exemplary English language keyword list 48, the lemma "attachment" which is a noun bearing Sense 2, is specified as a trigger keyword, while other senses are not.

For example, if the word "attachment" is found in a message in a context such as "He always felt a deep attachment to his wife" and the system is able to detect that in this case "attachment" belongs to Sense 1, a warning is not sent in the event that there is no attachment. In the example email in FIG. 1, for example, only the keyword "have attached" (lemma, "attach") 60 is a trigger word, while the word "attachment" 62 is not.

The text of the email is processed to provide the sense of an identified keyword. This may include natural language processing of the text containing the multi-sense word (S116). In particular, the text elements of a text string, such as a sentence, in the email text are processed by the parser 44 to identify syntactic relations between text elements, such as between words or groups of words which include the identified word (corresponding to a multi-sense keyword) or which refer to it by coreference. Coreference rules can be applied to identify a noun corresponding to a pronoun which refers to it by analysis of the text of a sentence or surrounding sentences. For example, in the sentences "Here is the file. I have attached it.", "it" may be disambiguated as referring to a "file" since the previous sentence refers to the file.

The exemplary detector 10 relies on natural language processing (NLP) techniques to identify linguistic elements in a text string in a natural language, such as English and syntactic relations (dependencies) between them. This function may be performed by the linguistic processor 44, such as a syntactic parser. The sense-related rules 50, which may also be applied by the parser 44, include disambiguation rules which each define one or more syntactic relations that include the keyword and specify an attachment-related inference when the rule is satisfied. The inference may be that the word is being used in an attachment sense or in a not-attachment sense, depending on the nature of the rule. In some embodiments, some or all of the natural language processing of some or all text in the email may be performed at an earlier stage, for example, to assist in language recognition.

Word sense disambiguation methods suitable for analyzing text to identify a sense in which the word is being used are disclosed, for example, in Caroline Brun, "A Client/Server Architecture for Word Sense disambiguation," in Proceedings of Coling 2000, p. 132, Saarbrücken, Germany.

The parser 44 takes a text string, such as a sentence, paragraph, or even a sequence of a few words as input and breaks each sentence into a sequence of tokens (linguistic elements) and associates information with these. The parser provides this functionality by applying a set of rules, called a grammar, dedicated to a particular natural language such as French, English, or Japanese. The grammar is written in the formal rule language, and describes the word or phrase configurations that the parser tries to recognize. The basic rule set used to parse basic documents in French, English, or Japanese is called the "core grammar." Through use of a graphical user interface, a grammarian can create new rules to add to such a core grammar. In some embodiments, the syntactic parser employs a variety of parsing techniques known as robust parsing, as disclosed for example in Salah Aït-Mokhtar, Jean-Pierre Chanod, and Claude Roux, "Robustness beyond shallowness: incremental dependency parsing," in special issue of the NLE Journal (2002); above-mentioned U.S. Pat. No. 7,058,567; and Caroline Brun and Caroline Hagège, "Normalization and paraphrasing using symbolic methods" ACL: Second International workshop on Paraphrasing, Paraphrase Acquisition and Applications, Sapporo, Japan, Jul. 7-12, 2003 (hereinafter Brun and Hagège). These example natural language processing techniques are well suited for analysis of e-mail content which can sometimes be grammatically informal or can use a telegraphic style that does not employ grammatically complete sentences and paragraphs. In one embodiment, the syntactic parser may be based on the Xerox Incremental Parser (XIP), which has been enriched with additional processing rules to facilitate the identification of a sense in which a recognized keyword is being used. Other natural language processing or parsing algorithms can be used. The rules for identifying the sense can be applied on top of the existing parser rules. For example, a rule can infer that a given word is used in a given sense considering the context.

The incremental parser 44 performs a pre-processing stage which handles tokenization, morphological analysis and part of speech (POS) tagging. Specifically, the preprocessing module of the parser breaks the input text into a sequence of tokens, each generally corresponding to a text element, such as a word, or punctuation. Parts of speech are identified for the text elements, such as noun, verb, etc. Some tokens may be assigned more than one part of speech. The tokens are tagged with the identified parts of speech.

A surface syntactic analysis stage performed by the parser includes chunking the input text to identify groups of words, such as noun phrases. Then, syntactic relations are identified, such as a relationship between a subject and a verb, or an object and a verb, and so forth. A deeper syntactic analysis may then be performed, although, for the present application, a full word sense disambiguation need not be performed. For example, the system need only spot the cases where a keyword is employed in a relevant sense (i.e., an attachment sense where it is considered a triggering word). The sense disambiguation need only be applied for the specific list of multi-sense keywords and for a subset of possible contexts, which reduces the processing as compared with all-word sense disambiguation.

For example, for the French sentence:
"Je joins le document demandé." ("I have attached the requested document."),
the detector 10 first tags the word "joins," as its lemma joindre is a keyword on the French list 47 of keywords. Joindre is a potential attachment trigger. In the context of the sentence above, it has the sense for "joindre un document/object" (attach a document/object). The detector 10 therefore infers that the user intends to attach a document and if none is attached, that one is potentially missing and the notification component 46 is prompted to display a warning 58.

In contrast, for the text string:

"Je me suis attaché à décrire la première partie" (I endeavored to describe the first part), the detector tags the word "attaché," as it is an instance of a keyword (attacher) on the French list 47 of keywords. However, the rules applied by the parser 44 for identifying the sense in which it is used in the sentence identify the sense as being "to commit oneself" (or simply classes it as a non-attachment sense). The rules therefore do not identify a sense which can trigger a missing attachment warning. Specifically, its' use in the sentence does not correspond to the sense "attacher un document/object (attach a document/object)". Accordingly, the notification component 46 does not display a warning if there is no attachment.

In the exemplary embodiment, word sense disambiguation is only employed for the lemmas that are present in the keyword lists and even then, need not be performed unless the keyword is a multi-sense keyword. Thus, a relatively limited set of rules are needed for identifying the context in which these words are used.

It is not necessary for the system to process all keywords in the email. As soon as a keyword is identified which satisfies a rule for a sense that is associated with an email attachment, this can trigger a check to see if there is an email attachment.

Generation of Keyword Lists and Sense Rules

Figure 3:
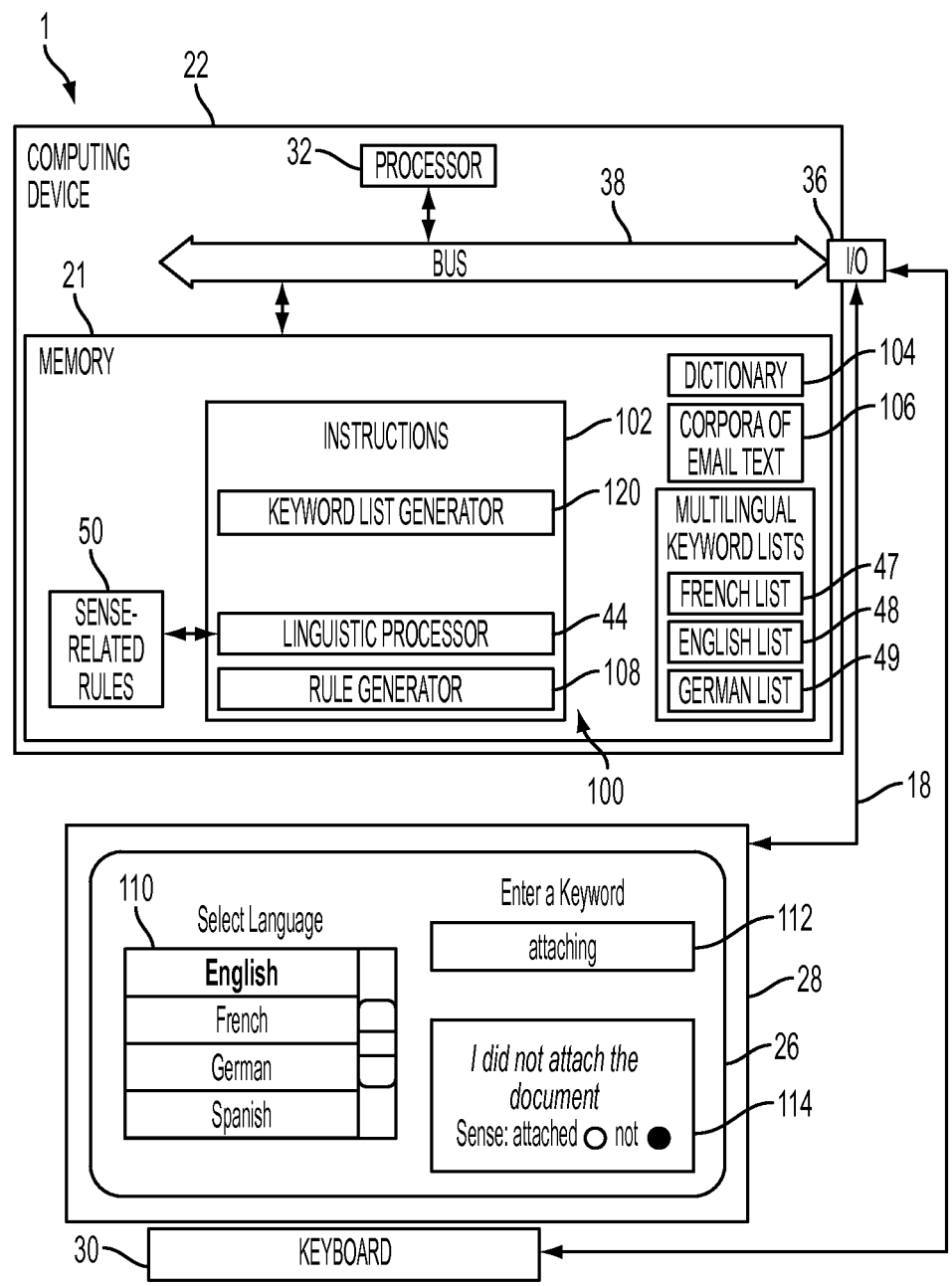
FIG. 3 illustrates a system for generating the keyword lists and sense analysis rules for the system of FIG. 1.
Figure 4:
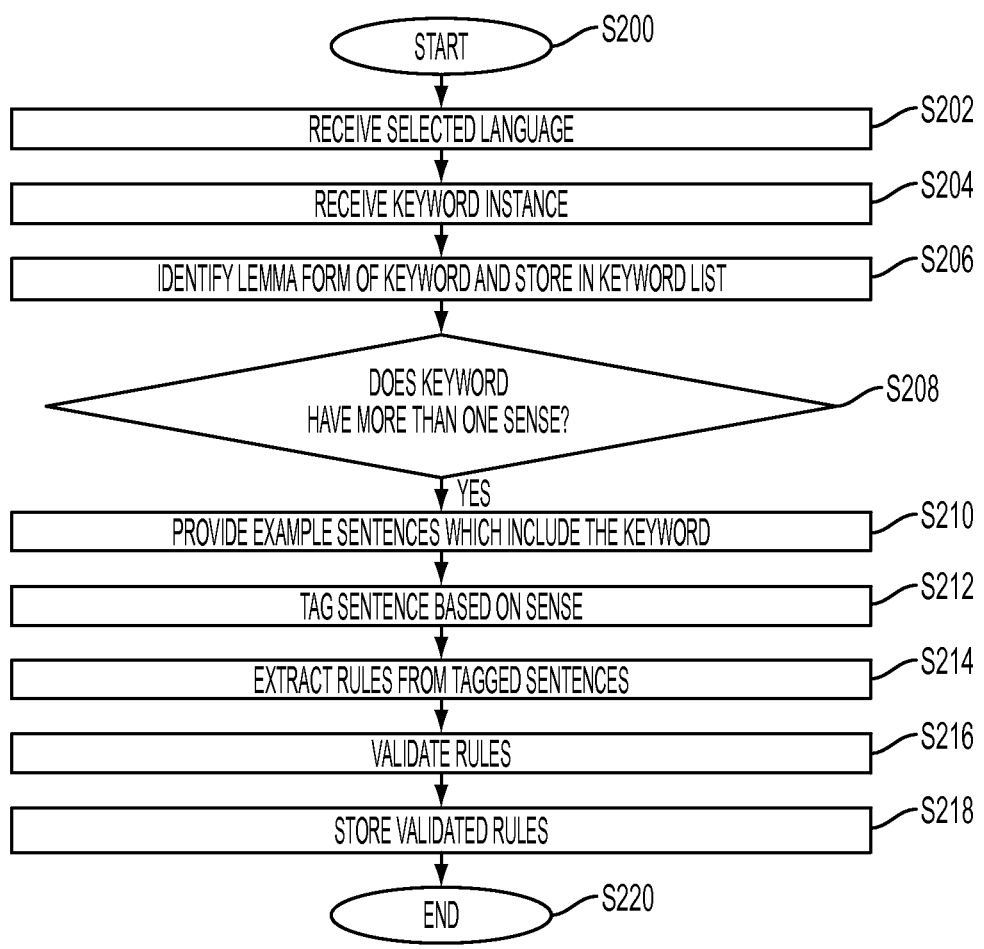
FIG. 4 illustrates a method for generating the keyword lists and sense analysis rules for use in the method of FIG. 2.

FIGS. 3 and 4 illustrate a computer implemented system 100 and method for generating the keyword lists 47, 48, 49 and sense rules 50 employed in exemplary system shown in FIG. 1. The system 100 may form a part of system 1 and use some of its components, or may be embodied in a separate computing device. Similar components are given the same reference numerals and perform analogously to the components shown in FIG. 1, except as otherwise noted.

The system 100 includes instructions 102 stored in memory 21 of a computing device 22, which are executed by an associated processor 32.

A dictionary 104 or other lexical resource is stored in memory 21 or in memory accessible to the system 100. Each language may have its own dictionary. The dictionary 104 can be accessed to identify each of the senses of a given keyword. These senses can be evaluated manually or automatically to assign the sense to one of two classes:

1) the sense is indicative of an attachment; or
2) the sense is not indicative of an attachment.

Manual assignment can be performed by having a person look at the keyword senses and examples in a dictionary to identify whether the keyword, when used in that sense, is likely to refer to an email attachment. Semi-automatic methods may additionally or alternatively be used. For example, a large corpus 106 of emails in each of a set of languages is stored in memory 21 or in remote memory accessible to the system. Text strings are extracted from the corpus 106 which each include an instance of a keyword and are presented to a user who assesses whether, in that context, the word is used in an attachment sense or not and applies an appropriate label. The labeled examples are then processed by a rule generator 108 to generate sense-related rules 50 and the identified lemmas for the keywords are stored in a list by a keyword list generator 120.

Rules 50 for identifying the sense can be derived automatically or semi-automatically from the training examples. For example, a set of sentences for each sense of the keyword are provided to the rule generator 108 for training the system. Each sentence is parsed by the parser 44 to extract relations in which an instance of the keyword is a part, such as subject: verb dependencies, object:verb dependencies, and the like. More generally, if a keyword occurs in the relation DEP(X, Y), either as term X or as term Y, where DEP represents a dependency selected from a set of several possible dependencies recognized by the parser, a rule which links DEP(X,Y) to the relevant sense can be generated. The other term in the relation can be a single word or a sequence of words and can be defined specifically or generally.

For each keyword, one or more rules, each rule being based on one or more such dependencies, can thus be generated. One or more of these rules for identifying whether a keyword is being used in an attachment-related sense can specify both the keyword and the other word in the dependency. This type of rule is referred to herein as a specific rule, and may be useful for some very common expressions. However, one or more rules may additionally or alternatively be a more general, class-based rule. A class-based rule matches the semantic context of the keyword, without necessarily matching its lexical context. Thus, in this case, several patterns can match the same rule.

Some rules may accept all instances of the lemma form. Thus for example, in the case of a noun, singular and plural forms may be accepted as satisfying the rule. In some cases, the rule may accept only certain instances of a lemma. Thus, for example, some tenses of a verb may be excluded, such as the future conditional form. Similar rules may limit certain inflected forms.

For example, in the sentence.

I have attached the report report is identified as being used as a noun of semantic type "document" and is the object of the verb attached (lemma attach). Thus, the relation DIROBJ(attached, report) extracted from the sentence can be converted to a rule or part of a rule:

If DIROBJ(attach*, noun Y[semantic type="document"])
then sense is attachment,
where attach* accepts all instances of the lemma attach (verb), except for any specified tenses that are not accepted such as, for example, the future conditional form and Y is any noun.

Or, the relation can be used to create a specific rule:

DIROBJ(attach*, noun report*), where attach* accepts all instances of the lemma attach (verb), except for any specified tenses that are not accepted such as, for example, the future conditional form and report* accepts singular and plural forms of the lemma report.

Negation may also be taken into account. For example, the string "I did not attach the letter" may be processed to identify the relation involving attach and letter but the relation involving not and attach is identified as negation and thus an email attachment warning is not triggered.

Rules may been tested on training samples and if they do not provide a threshold precision and/or accuracy, they may be further refined or omitted from the set.

Thus, one set of rules for identifying the sense "attach a document" may be:

If attach has a direct object which is classed as a document (i.e., the semantic type of the direct object is "document", for example, for a predefined list of nouns such as "report", "file", "letter", "cv", etc.)
then it is a sense that can trigger a missing attachment warning.

In one embodiment, the method may use automatic or semi-automatic enrichment for language pairs whereby given a keyword in a keyword list for a first language A, the equivalent keyword appears in the keyword list for language B. Some keywords in the lists 47, 48, 49 may thus be aligned with each other. This alignment can be performed manually or semi-automatically using aligned corpora or using multilingual lexicons (dictionaries). A multi-lingual language A:B dictionary can be used for identifying keywords in language B corresponding to keywords in the language A list. These new keywords may be proposed to a user for validation. Accepted keywords can then be added to the list(s) of the other language(s). An added keyword may then be processed in its own language to ensure that it is associated with the correct sense information for that language. For example the English lemma "attach" may be aligned with the French lemma "joindre (sense 2)" and also with the Portuguese lemma "juntar" if the user selects these three languages for her keyword lists.

Method for Rule Generation

With reference also to FIG. 4, a method which can be performed with the system 100 is illustrated. The method begins at S200.

At S202, a user selects a language, e.g., using a language selector 110 displayed on GUI 26 (FIG. 3). The language selection is received by the system 100.

At S204, an instance of a keyword is received. For example, the user inputs an instance of a keyword, e.g., in keyword entry box 112. Optionally, keywords are proposed to the user based on aligned keywords which have already been added to lists in other languages. The keyword instance is received by the system 100. The system may check to see whether the keyword has more than one part of speech. The user may be asked to specify its part of speech, if there is more than one listed in the relevant dictionary 104.

At S206, the lemma form of the keyword is identified, e.g., by the linguistic processor 44 applying lemmatization rules, and the lemma is stored in the respective keyword list 48, if it does not already exist.

At S208, the dictionary 104 is accessed to identify whether the new keyword (with the selected part of speech) has more than one sense.

At S210, for keywords with more than one listed sense, example sentences 114 in the selected language which include the keyword are extracted from the relevant corpus 106 for the language selected and at S212 are tagged with a respective attachment sense. In FIG. 3, for example, a sentence is presented to a user who selects the sense, "not attached."

At S214, one or more sense-related rules 50 are extracted from the tagged sentences.

At S216, the rules are validated. For example, the rules are applied to a testing set of emails from the corpus 106, each of which includes an instance of the keyword (generally, no more than one instance of the keyword, to reduce confusion). Some of these emails have been sent with attachments, others without. If a rule correctly assigns at least a threshold proportion of the emails to the correct class (attachment or no attachment), based on whether or not the email had an attachment, it is considered valid. Otherwise, the rule may be rejected or further refined, for example, by adding additional element(s) to the rule or by more precisely specifying one or more existing elements.

At S218, the validated rules are stored.

The method ends at S220.

Word sense disambiguation techniques can be very accurate when there are sufficient context examples for training. For further details of methods to develop disambiguation rules, see above-mentioned U.S. Pat. No. 6,405,162.

The methods illustrated in FIGS. 2 and 4 may be implemented in a computer program product or products that may be executed on a computer. The computer program product may include a non-transitory computer-readable recording medium on which a control program is recorded. Common forms of computer-readable non-transitory recording media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, combination thereof, or any other non-transitory medium from which a computer can read and use.

Alternatively, the method may be implemented in a transitory medium, such as a transmittable carrier wave in which the control program is embodied as a data signal using transmission media, such as acoustic or light waves, such as those generated during radio wave and infrared data communications, and the like.

The exemplary method(s) may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2 and/or FIG. 4, can be used to implement the exemplary method(s).

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for providing a warning to a user of a missing attachment to an email, comprising:

recognizing a natural language of text of an email;

selecting a keyword list from a plurality of keyword lists, based on the recognized natural language, each of the plurality keyword lists being associated with a respective natural language and including at least one keyword, at least one of the keyword lists including a multi-sense keyword having a plurality of senses, wherein a first of the plurality of senses is recognized as referring to an attachment and a second of the plurality of senses is not recognized as referring to an attachment, the keyword list associatinq a part of speech with each keyword which has more than one part of speech and where at least one of the parts of speech is not recognized as being associated with an attachment;

processing the text to identify an instance of a keyword that is in the selected keyword list, including confirming that the instance has the associated part of speech;

for the identified instance, determining whether the keyword is a multi-sense keyword;

with a computer processor, where the keyword is identified a multi-sense keyword, applying at least one sense-related rule to a portion of the text which includes the instance of the multi-sense keyword; and based on the application of the at least one sense-related rule, where the email lacks an attachment, providing a notification to the user.

2. The method of claim 1, wherein the keywords in the selected list of keywords are lemma forms.

3. The method of claim 2, wherein the processing of the text to identify instances of the keyword in the text includes identifying a lemma form of a word in the text and deterring whether the lemma form is among the keywords in the selected list.

4. The method of claim 1, wherein determining if the keyword is a multi-sense keyword comprises accessing information associated with the keyword list.

5. The method of claim 1, wherein for a keyword which is determined to be a multi-sense keyword, the method includes parsing the portion of text to identify at least one syntactic relation which includes the instance of the keyword.

6. The method of claim 1, wherein the at least one sense-related rule is based on at least one syntactic relation which includes at least one instance of the keyword.

7. The method of claim 1, wherein at least some of the multi-sense keywords in the keyword lists are each associated with at least one sense-related rule, the rule accepting at least one instance of the keyword and another term that are in a defined dependency relationship.

8. The method of claim 1, wherein the notification comprises displaying a message on an associated display.

9. The method of claim 1, wherein the recognizing of the natural language is performed with a language guesser.

10. The method of claim 1, further comprising providing for generating the sense-based rules for keywords comprising:
providing instructions for:
parsing text which includes an instance of a multi-sense keyword to identify one or more syntactic relations which include the instance and another term; and
based on the identified one or more syntactic relations, generating a sense-based rule which is also based on a sense in which the instance is used in the text.

11. The method of claim 1, wherein the identified instance is determined not to be a multi-sense keyword and where the email lacks an attachment, providing a notification to the user.

12. A computer program product comprising a non-transitory recording medium encoding instructions, which when executed on a computer, causes the computer to perform the method of claim 1.

13. A system for performing the method of claim 1 comprising non-transitory memory which stores instructions for performing the method and a processor in communication with the memory for executing the instructions.

14. A method for providing a warning to a user of a missing attachment to an email, comprising:
recognizing a natural language of text of an email;
selecting a keyword list based on the recognized natural language, the selected keyword list including a multi-sense keyword having a plurality of senses, wherein a first of the plurality of senses is recognized as referring to an attachment and a second of the plurality of senses is not recognized as referring to an attachment, at least one of the sense-related rules being a class based rule which accepts a multi-sense keyword that is in a defined dependency relationship with any one of a set of terms which are tagged with the same part of speech;
processing the text to identify an instance of a keyword that is in the selected keyword list;
for the identified instance, determining whether the keyword is a multi-sense keyword;
with a computer processor, where the keyword is identified a multi-sense keyword, applying at least one sense-related rule to a portion of the text which includes the instance of the multi-sense keyword; and
based on the application of the at least one sense-related rule, where the email lacks an attachment, providing a notification to the user.

15. The method of claim 14, wherein at least one of the sense-based rules accepts all instances of the keyword.

16. The method of claim 14, wherein the keyword list associates a part of speech with each keyword which has more than one part of speech and wherein at least one of the parts of speech is not recognized as being associated with an attachment, the processing the text to identify an instance of a keyword including confirming that the instance has the associated part of speech.

17. A system for processing emails comprising:
a language guesser configured for recognizing a natural language of text of an email;
a plurality of keyword lists stored in memory, each of the plurality keyword lists being associated with a respective natural language and including at least one keyword, at least one of the keyword lists including at least one multi-sense keyword having a plurality of senses, wherein the keyword list recognizes that a first of the plurality of senses refers to an attachment and that a second of the plurality of senses does not refer to an attachment;
a keyword list selector which selects a keyword list from the plurality of keyword lists, based on the recognized natural language;
a linguistic processor configured for processing the text to identify syntactic relations that include an instance of a multi-sense keyword in the selected keyword list, and for applying at least one sense-based rule for evaluating whether the instance is used in the sense that is recognized in the selected keyword list as referring to an attachment;
a notification component for providing a notification of a missing attachment to a user where the email lacks an attachment and where the linguistic processor determines, based on the application of the at least one rule, that the user intended to add an attachment to the email; and
a computer processor which implements the language guesser, keyword list selector, linguistic processor, and notification component.

18. A method for detecting a missing attachment to an email, comprising:
providing a list of keywords in a selected natural language and associating information designating at least one of the keywords in the list as a multi-sense keyword having a plurality of senses, the associated information recognizing that at least one of the plurality of senses refers to an attachment and another of the plurality of senses does not to an attachment;
providing at least one sense-related rule for identifying whether an instance of a keyword in text of an email is being used in a sense that is recognized as referring to an attachment;
processing text of an email to identify an instance of one of the keywords that is in the keyword list;
based on the information, determining whether the keyword for the instance is a multi-sense keyword;
for the identified instance, where the keyword is a multi-sense keyword, applying at least one of the sense-related rules to a portion of the text which includes the instance of the multi-sense keyword to determine whether the instance is being used in a sense that is recognized as referring to an attachment; and
detecting that an attachment is missing where the instance of the multi-sense keyword is determined to be used in a sense recognized as referring to an attachment and the email lacks an attachment; and wherein at least one of the determining, applying, and detecting is performed with a computer processor.

19. The method of claim 18, wherein the at least one sense related rule includes at least one of:
a rule which accepts a part of speech of the multi-sense keyword, where the multi-sense keyword has a plurality of parts of speech and at least one of the parts of speech is not recognized as referring to an attachment; and
a rule which accepts a term which is in a defined dependency relationship with the multi-sense keyword, where the term is selected from a set of terms which are tagged with the same part of speech.

20. A method for generating rules for identifying an email which is referring to an attachment comprising:
providing a set of text strings, each of the text strings including an instance of a multi-sense keyword which has a plurality of senses wherein a first of the plurality of senses is recognized as referring to an attachment and a second of the plurality of senses is recognized as not referring to an attachment;
associating each text string with one of the plurality of senses in which the instance is being used;
parsing each text string to identify one or more syntactic relations which include the respective instance;
based on at least one of the identified syntactic relations, generating a sense-based rule which is also based on the associated sense in which the instance is used; and
storing the multi-sense keyword in a keyword list which designates each of the multi-sense keywords as having a plurality of senses and which triggers the application of the sense-based rule when one of the multi-sense keywords is detected in an email message; and
wherein at least one of the associating, parsing, and generating is performed with a computer processor.

21. A computer program product comprising a non-transitory recording medium encoding instructions, which when executed on a computer, causes the computer to perform the method of claim 20.

22. A system for performing the method of claim 20 comprising non-transitory memory which stores instructions for performing the method and a processor in communication with the memory for executing the instructions.

* * * * *